Feb. 10, 1948. J. C. PEARSON, JR 2,435,694
CONVEYOR BELT
Filed March 1, 1946 2 Sheets-Sheet 1
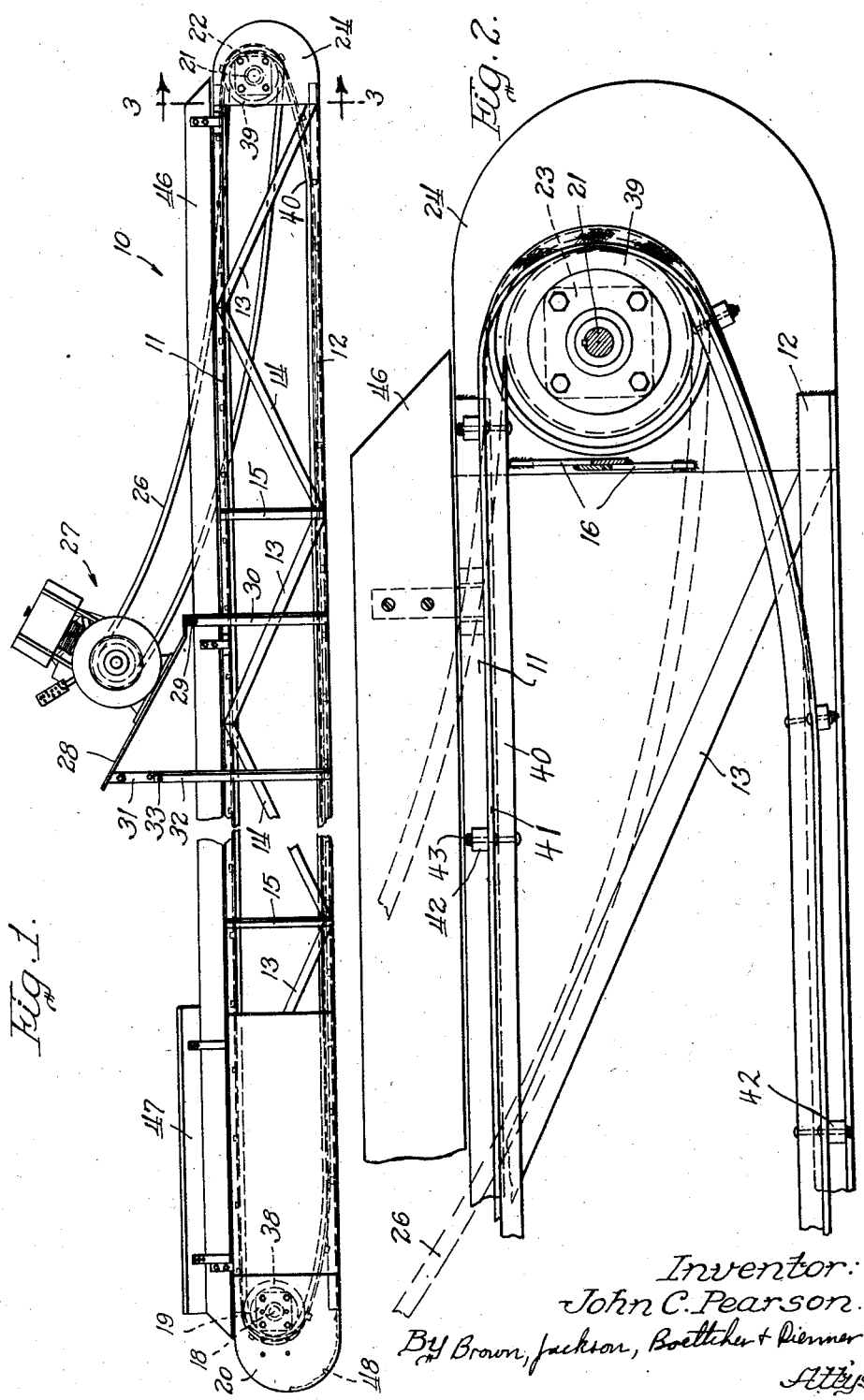

Feb. 10, 1948.   J. C. PEARSON, JR   2,435,694
CONVEYOR BELT
Filed March 1, 1946   2 Sheets-Sheet 2
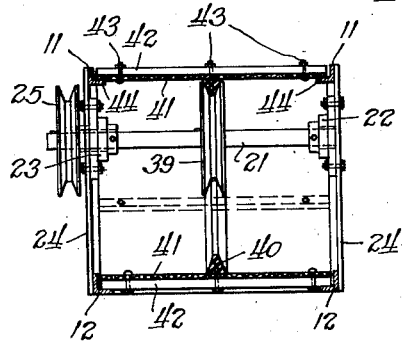
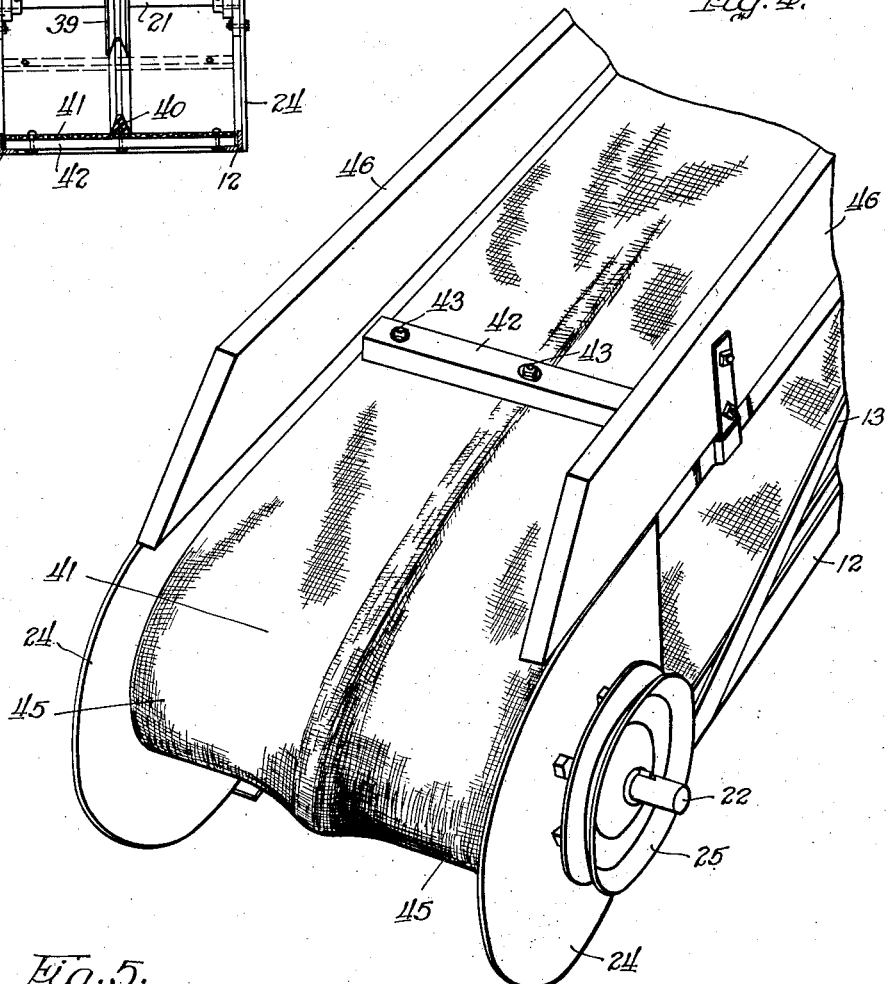
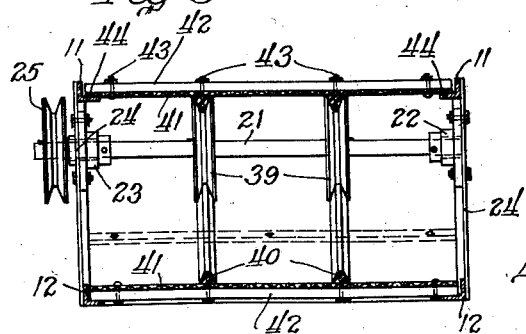
Inventor:
John C. Pearson.
By Brown, Jackson, Boettcher & Dienner
Attys.

Patented Feb. 10, 1948

2,435,694

UNITED STATES PATENT OFFICE 2,435,694

CONVEYOR BELT

John C. Pearson, Jr., Oklahoma City, Okla.

Application March 1, 1946, Serial No. 651,059

8 Claims. (Cl. 198—199)

My invention relates, generally, to material handling devices or apparatus and it has particular relation to portable power driven devices for loading loose bulk materials, such as cottonseed, grain and the like, into trucks, railroad cars and the like, although it may be used in handling other materials and for other applications.

An object of my invention, generally stated, is to provide a material handling device for loose bulk materials which shall be simple and efficient in operation and which may be readily and economically manufactured, installed and used.

Another object is to provide for loading and unloading loose bulk materials, such as cottonseed, grain and the like, into and out of trucks, railroad cars and the like.

A further object is to increase the life of the canvas belt of a belt conveyor without reducing the operating efficiency of the conveyor.

Still another object is to support a relatively wide conveyor belt having relatively low tensile strength at its edges at one or more points intermediate the same without applying excessive tension to the edges where they loop around the end pulleys or sheaves.

Other objects of my invention will in part be obvious and in part appear hereinafter.

My invention is disclosed in the embodiments thereof shown in the accompanying drawings and it comprises the features of construction, combination of elements and arrangement of parts which will exemplified in the constructions hereinafter set forth and the scope of the application of which will be indicated in the appended claims.

For a more complete understanding of the nature and scope of my invention reference can be had to the following detailed description taken in connection with the accompanying drawings in which:

Figure 1 is a view, in side elevation, of a preferred embodiment of a material handling device constructed in accordance with my invention;

Figure 2 is a sectional view, at an enlarged scale, of the right hand end of the conveyor shown in Figure 2, the view being taken with one side frame removed to show more clearly the details of construction;

Figure 3 is a view taken along the line 3—3 of Figure 1;

Figure 4 is a perspective view of the delivery end of the conveyor; and

Figure 5 is a detail sectional view, similar to that of Figure 3, showing a modification of the invention.

Referring now, particularly to Figures 1, 2 and 3 of the drawings, it will be noted that reference character 10 designates, generally, a frame that may be constructed of angle iron, the parts being welded together in conventional manner. The frame 10 comprises upper and lower angles 11 and 12, respectively, which may be longitudinally braced by inclined angles 13 and 14 and vertically braced by struts 15. The frame 10 is crossbraced by straps 16 which are formed in pairs to provide a conventional X configuration.

The upper angles 11 are turned toward each other, as illustrated in Figure 3, so as to provide an upper belt trough. Likewise the lower angles 12 are turned toward each other to provide a lower belt trough. The utility of these belt troughs will be set forth presently.

While the frame 10 is illustrated in Figures 1 and 2 of the drawings in horizontal position, it will be understood that it is intended to be positioned at an angle with respect to a truck, for example. As will hereinafter appear, it is intended that the conveyor will be loaded at its left hand end, which will be the lower end, and that the material will be elevated and delivered at the right hand end or higher end.

As shown in Figure 1, a shaft 18 extends crosswise of the frame 10 and is rotatably mounted in bearings 19 that are mounted on the insides of end plates 20 that may be secured, as by welding, to the adjacent ends of the angles 11 and 12.

At the right hand end of the frame 10, the corresponding shaft 21 is rotatably mounted in bearings 22 and 23. As shown more clearly in Figure 3, the bearing 22 is mounted on the inside of one of a pair of end plates 24 while the bearing 23 is mounted on the other of the pair of end plates 24 and projects therethrough so as to permit the shaft 21 to extend sufficiently far for receiving a drive sheave 25.

The sheave 25 may be driven by any suitable means. For example, it may be constructed to receive a V-belt 26 which can be driven by a motor, such as an internal combustion engine 27. Obviously, other motor means, such as an electric motor, can be used in place of the engine 27.

The engine 27 may be mounted on a platform 28, one end of which is pivoted at 29 to the upper end of an angle frame upright 30. The platform 28 is mounted at its other end by a link 31, pivoted thereto, and arranged to be secured to an angle frame upright 32 as by a pin 33. It will be understood that the inclination of the platform 28 can be changed as desired by changing the location of link 31 with respect to the pin 33.

The shaft 18 is provided intermediate its ends with a V-belt sheave or pulley 38 and a similar V sheave or pulley 39 is provided in alignment therewith on the shaft 21. The sheaves 38 and 39 may be keyed to the shafts 18 and 21 or secured thereto by any other suitable means. While the sheave 38, for example, is shown and described as being rotatable with shaft 18, it will be understood that it may be rotatably mounted thereon and the shaft 18 may be stationarily mounted without departing from the spirit of my invention. The sheave 39 may be similarly mounted without departing from the invention.

A V-belt 40 of conventional design and having relatively great tensile strength is trained over the sheaves 38 and 39. Surrounding the V-belt 40 and arranged to receive and convey the bulk material is a belt 41 which is relatively wide as compared to the width of the V-belt 40. The conveyor belt 41 is preferably formed of a material, such as canvas, which has a relatively low tensile strength as compared to that of the V-belt 40. By combining the relatively high tensile strength V-belt 40 with the relatively low tensile strength belt 41 having a relatively greater width, it is possible to provide a relatively inexpensive conveyor belt construction which has the necessary material carrying capacity and the required strength for performing its function. At the same time, it is unnecessary to make the complete belt of relatively expensive material, such as that used in making the V-belt 40.

With a view to transversely supporting the conveyor belt 41, rigid cross bars 42 of wood or the like are provided crosswise thereof and are secured thereto and to the V-belt 40 by suitable means such as bolts 43. The edges 44 of the upper portion of the conveyor belt 41 ride along the inwardly extending flanges of the upper angles 11 which form the upper belt trough. The ends of the cross bars 42 along the under portion of the conveyor belt 41 ride along the upper surfaces of the inwardly extending flanges of the lower angles 12 which form the lower belt trough.

It will be apparent now that the edges of the upper portion of the belt 41 are supported in the upper belt trough and that the conveyor belt 41 therebetween is held in the plane thereof by the cross bars 42. Thus a relatively rigid, light weight and inexpensive conveyor belt construction is provided. By having the ends of the cross bars 42 ride in the lower belt trough formed by the angles 12, the lower portion of the belt 41 is supported and clears any object located below the plane of the angles 12.

As shown more clearly in Figure 4, the conveyor belt is tensioned principally at the center thereof as it passes over the sheave 39. The edges, as indicated at 45 where they loop around the shaft 21, are entirely unsupported and therefore they are substantially unstretched in this location. The same holds true for the other end of the frame 10 where the conveyor belt 41 loops around the sheave 38. Since the edges of the conveyor belt 41 are not substantially tensioned as they loop around the end sheaves, the life thereof is correspondingly prolonged.

With a view to preventing material carried by the conveyor belt 41 from spilling over the sides of the frame 10, side boards 46 may be removably mounted therealong as illustrated in Figures 1, 2 and 4 of the drawings. At the feed end, outflared boards 47 may be mounted, thereby providing a hopper to facilitate depositing the material onto the conveyor belt 41. If desired, a shield 48 may be provided at the left end of the frame 10 for catching any material that may spill over while the conveyor belt 41 is being loaded. The shield 48 may be formed of suitable sheet metal and may be welded to the lower angles 12 and between the end plates 20, as desired.

In Figure 5 of the drawings, a conveyor construction is illustrated in which two V-belts 40 are used where the conveyor belt 41 is substantially wider than as shown in Figure 3. The sheaves, for example the sheaves 39, are spaced sufficiently far apart so as to distribute uniformly the load applied by the conveyor belt 41 and at the same time they are spaced sufficiently far from the edges 44 thereof so that, when they loop around the end sheaves, these edges will be substantially untensioned and the life of the conveyor belt will be correspondingly prolonged as described hereinbefore.

Since certain further changes can be made in the foregoing constructions and different embodiments of the invention can be made without departing from the spirit and scope thereof, it is intended that all matter shown on the accompanying drawings and described hereinbefore shall be interpreted as illustrative and not in a limiting sense.

I claim as my invention:

1. Material handling apparatus comprising, in combination, upper and lower belt troughs, sheave means rotatably mounted at each end of said troughs and between the sides thereof, belt means trained over said sheave means, and a conveyor belt disposed around and secured to said belt means with the edges of the upper and lower portions thereof riding in said upper and lower troughs respectively, said conveyor belt being substantially wider than the spacing between the outer edges of said sheave means whereby the edges of said conveyor belt are substantially free of tension as it loops around said sheave means.

2. Material handling apparatus comprising, in combination, upper and lower belt troughs, sheave means rotatably mounted at each end of said troughs and between the sides thereof, belt means trained over said sheave means, a conveyor belt disposed around and secured to said belt means with the edges of the upper and lower portions thereof riding in said upper and lower troughs respectively, said conveyor belt being substantially wider than the spacing between the outer edges of said sheave means whereby the edges of said conveyor belt are substantially free of tension as it loops around said sheave means, and reenforcing means extending transversely in spaced relation along said conveyor belt and cooperating with said belt means and said belt troughs for maintaining said conveyor belt in position.

3. Material handling apparatus comprising, in combination, upper and lower belt troughs, sheave means rotatably mounted at each end of said troughs and between the sides thereof, belt means trained over said sheave means, a conveyor belt disposed around said belt means with the edges of the upper and lower portions thereof riding in said upper and lower troughs respectively, said conveyor belt being substantially wider than the spacing between the outer edges of said sheave means whereby the edges of said conveyor belt are substantially free of tension as it loops around said sheave means, and rigid reenforcing members extending crosswise of said conveyor belt in spaced relation therealong and secured thereto and to said belt means.

4. Material handling apparatus comprising, in combination, upper and lower belt troughs, a sheave having a V-groove rotatably mounted at each end of said troughs and between the sides thereof, a V-belt trained over said sheaves, and a conveyor belt having relatively small tensile strength as compared to that of said V-belt and being several times its width and disposed therearound and secured thereto with the edges of the upper and lower portions riding in said upper and lower troughs respectively and being substantially unsupported and thereby substantially free of tension as the conveyor belt loops around said sheaves.

5. Material handling apparatus comprising, in combination, upper and lower belt troughs, a sheave having a V-groove rotatably mounted at each end of said troughs and between the sides thereof, a V-belt trained over said sheaves, a conveyor belt having relatively small tensile strength as compared to that of said V-belt and being several times its width and disposed therearound and secured thereto with the edges of the upper and lower portions riding in said upper and lower troughs respectively and being substantially unsupported and thereby substantially free of tension as the conveyor belt loops around said sheaves, and reenforcing means extending transversely in spaced relation along said conveyor belt and cooperating with said belt means and said belt troughs for maintaining said conveyor belt in position.

6. Material handling apparatus comprising, in combination, upper and lower belt troughs, a sheave having a V-groove rotatably mounted at each end of said troughs and between the sides thereof, a V-belt trained over said sheaves, a conveyor belt having relatively small tensile strength as compared to that of said V-belt and being several times its width and disposed therearound with the edges of the upper and lower portions riding in said upper and lower troughs respectively and being substantially unsupported and thereby substantially free of tension as the conveyor belt loops around said sheaves, and rigid reenforcing members extending crosswise of said conveyor belt in spaced relation therealong and secured thereto and to said belt means.

7. Material handling apparatus comprising, in combination, a generally horizontal frame formed by upper and lower pairs of angle-irons arranged to provide upper and lower belt troughs and braced to form a rigid construction, a shaft mounted for rotation crosswise at each end of said frame, one of said shafts being arranged to be driven by power means, a sheave having a V-groove mounted on each shaft intermediate its ends and between said pairs of angle-irons, a V-belt trained over said sheaves; a conveyor belt of canvas-like material having relatively small tensile strength as compared to that of said V-belt, having a width several times that of said V-belt and said sheaves, and disposed around said V-belt over said sheaves with the edges of the upper portion riding in said upper belt trough; and cross bars extending transversely of the outer surface of said conveyor belt substantially to the edges thereof and secured thereto and to said V-belt, the ends of said cross bars along the under portion of said conveyor belt riding in said lower belt trough; the edges of said conveyor belt being unsupported and thereby substantially free of tension as they loop around said shafts whereby wear of said conveyor belt is reduced substantially and the life thereof is prolonged correspondingly.

8. Material handling apparatus comprising, in combination, a generally horizontal frame formed by upper and lower pairs of angle-irons arranged to provide upper and lower belt troughs and braced to form a rigid construction, a shaft mounted for rotation crosswise at each end of said frame, one of said shafts being arranged to be driven by power means, a plurality of sheaves each having a V-groove mounted on each shaft intermediate its ends and between said pairs of angle-irons, V-belts trained over said sheaves; a conveyor belt of canvas-like material having relatively small tensile strength as compared to that of said V-belt, having a width substantially greater than the spacing between the outer edges of said sheaves on each shaft, and disposed around said V-belts over said sheaves with the edges spaced substantial distances therefrom and the edges of the upper portion riding in said upper belt trough; and cross bars extending transversely of the outer surface of said conveyor belt substantially to its edges and secured thereto and to said V-belts, the ends of said cross bars along the under portion of said conveyor belt riding in said lower belt trough; the edges of said conveyor belt being unsupported and thereby substantially free of tension as they loop around said shafts whereby wear of said conveyor belt is reduced substantially and the life thereof is prolonged correspondingly.

JOHN C. PEARSON, Jr.

REFERENCES CITED

The following references are of record in the file of this patent:

UNITED STATES PATENTS

| Number | Name | Date |
| --- | --- | --- |
| 1,860,519 | Wickersham | May 31, 1932 |
| 2,385,829 | Melroe | Oct. 2, 1945 |